US012725899B2

(12) United States Patent
Ettorre et al.

(10) Patent No.: US 12,725,899 B2
(45) Date of Patent: Sep. 1, 2026

(54) MULTILAYER WAVEGUIDE STRUCTURES FOR RADIOFREQUENCY ANTENNAS, RADIOFREQUENCY ANTENNAS COMPRISING THE SAME

(71) Applicants: Centre national de la recherche scientifique, Paris (FR); CENTRALESUPELEC, Gif sur Yvette (FR); Institut National des Sciences Appliquées, Rennes (FR); Nantes Université, Nantes (FR); UNIVERSITE DE RENNES, Rennes (FR)

(72) Inventors: Mauro Ettorre, Rennes Cedex (FR); Ronan Sauleau, Rennes Cedex (FR); Adham Mahmoud, Rennes Cedex (FR)

(73) Assignees: Centre national de la recherche scientifique, Paris (FR); CENTRALESUPELEC, Gif sur Yvette (FR); Institut National des Sciences Appliquées, Rennes (FR); Nantes Université, Nantes (FR); UNIVERSITE DE RENNES, Rennes (FR)

( * ) Notice: Subject to any disclaimer, the term of this patent is extended or adjusted under 35 U.S.C. 154(b) by 11 days.

(21) Appl. No.: 18/841,120

(22) PCT Filed: Feb. 27, 2023

(86) PCT No.: PCT/EP2023/054868

§ 371 (c)(1),
(2) Date: Aug. 23, 2024

(87) PCT Pub. No.: WO2023/161485

PCT Pub. Date: Aug. 31, 2023

(65) Prior Publication Data

US 2025/0167419 A1 May 22, 2025

(30) Foreign Application Priority Data

Feb. 28, 2022 (EP) .................................... 22305223

(51) Int. Cl.
*H01P 5/02* (2006.01)
*H01Q 1/42* (2006.01)

(52) U.S. Cl.
CPC ............. *H01P 5/024* (2013.01); *H01Q 1/422* (2013.01)

(58) Field of Classification Search
CPC ......... H01P 5/024; H01P 5/12; H01Q 1/2283; H01Q 1/422
See application file for complete search history.

(56) References Cited

U.S. PATENT DOCUMENTS 9,246,232 B2 1/2016 Sauleau et al.
9,257,735 B2 * 2/2016 Fakharzadeh ........... H01P 5/107
(Continued)

FOREIGN PATENT DOCUMENTS

FR 3057999 A1 4/2018

OTHER PUBLICATIONS

International Search Report dated May 16, 2023 in International Application No. PCT/EP2023/054868.
(Continued)

*Primary Examiner* — Thien M Le
(74) *Attorney, Agent, or Firm* — B. Aaron Schulman, Esq.; Stites & Harbison, PLLC

(57) ABSTRACT

A multilayer waveguide structure (2) for a radiofrequency antenna comprises: —a stack of substrates (4) separated by each other by interface layers (10), the substrates having a permittivity larger or equal to 1, and —metal vias (12) or metal trenches formed in at least some of the substrates. Each interface layer (10) comprises a first metal layer (16),
(Continued)

a second metal layer (18), and an adhesive layer (14) between the first metal layer (16) and the second metal layer (18). At least one of said interface layer (10) comprises patterned structures (R12), for which the adhesive layer (14) is thinner while still preventing a direct electric contact between the first and second metal layers (16, 18), and each said patterned structure (R12) is located near or at the base or the top of a metal via (12) or metal trench.

10 Claims, 4 Drawing Sheets

(56) References Cited

U.S. PATENT DOCUMENTS

| | | | | |
|---|---|---|---|---|
| 10,879,577 | B2 | 12/2020 | Capet et al. | |
| 11,555,961 | B1 * | 1/2023 | Koshelev | G02B 6/0061 |
| 2008/0107802 | A1 | 5/2008 | Kawaguchi et al. | |
| 2008/0121416 | A1 | 5/2008 | Hirai et al. | |
| 2015/0270616 | A1 * | 9/2015 | Jafarlou | H01Q 13/02 29/601 |
| 2016/0164189 | A1 * | 6/2016 | Jafarlou | H01Q 13/02 29/601 |
| 2019/0227234 | A1 * | 7/2019 | Ring | G02B 6/13 |
| 2019/0271810 | A1 * | 9/2019 | Ring | G02B 6/132 |
| 2019/0319327 | A1 | 10/2019 | Capet et al. | |
| 2020/0132927 | A1 * | 4/2020 | Cheng | H10F 77/413 |
| 2020/0358176 | A1 * | 11/2020 | Harper | H01Q 1/48 |
| 2021/0333473 | A1 * | 10/2021 | Venkatesan | G01M 11/30 |
| 2022/0013915 | A1 * | 1/2022 | Han | H01Q 1/243 |
| 2023/0208101 | A1 * | 6/2023 | Kuyken | H01S 5/4087 356/326 |

OTHER PUBLICATIONS

Written Opinion dated May 16, 2023 in International Application No. PCT/EP2023/054868.

European Search Report dated Aug. 23, 2022 in European Application No. 22 30 5223.

* cited by examiner

MULTILAYER WAVEGUIDE STRUCTURES FOR RADIOFREQUENCY ANTENNAS, RADIOFREQUENCY ANTENNAS COMPRISING THE SAME

TECHNICAL FIELD

The present disclosure relates to multilayer waveguide structures for radiofrequency antennas. The invention is applicable to radiofrequency antennas used in fields such as satellite communication systems, 5G and beyond antennas, radars and surveillance systems.

BACKGROUND

Mega-constellations of satellites in the Low Earth Orbit (LEO) and the Medium Earth Orbit (MEO) have gained significant interest in recent years as a means to provide competitive telecommunication services to wired and wireless terrestrial networks.

Historically, this idea is not new. For example, the Iridium constellation was launched in the 1980s, but eventually failed to be economically viable. One reason for this failure was the prohibitive cost of the end-user terminals, which required complex and expensive tracking antennas.

As of late, mega-constellations projects such as Starlink by Space X and others have prompted renewed interest in developing affordable scanning terminal antennas capable of providing satisfying performances at a reasonable cost.

Recent developments have focused in the millimeter wavelength range and in particular in the Ka-band and the K-band. The allocated frequency ranges for receiving (Rx) and transmitting (Tx) bands are usually 17.3-21.2 GHz and 27.5-31 GHZ, respectively.

An ideal antenna terminal must have a wide scanning capability (e.g. higher than ±65°) and must use simple, light, and low-profile structures (e.g. thinner than 10 cm at Ka-band) in order to be capable of being integrated on moving platforms (such as terrestrial vehicles, aircrafts, drones, handheld devices, etc.). The antenna terminal must have a low energy consumption and must be capable of being mass-manufactured with a low manufacturing cost.

Generally, satellite user terminals belong to one of three main categories, depending on the technology used by their scanning mechanism: electronic scanning (also known as phased arrays), mechanical steering, and electro-mechanical scanning.

Mechanically scanned platforms offer a wide angular coverage and good radiation performance but they are generally bulky and heavy. Some solutions use two separate antennas (an antenna for transmitting on one band and another antenna one for receiving on another band), but such solutions require considerable space.

Electro-mechanical hybrid solutions combining electronic scanning in one plane and mechanical scanning in another plane are often too complex and expensive.

Phased array antennas are often the most agile solution. Their main advantages are the speed and ability to control the antenna main beam with very thin structures.

Planar antennas comprising multilayered parallel plate waveguide structures built on printed circuit board (PCB) substrates are of particular interest. An example of a parallel plate waveguide structure is disclosed in French patent application FR 3057999 A1.

These promising solutions suffer from certain drawbacks, most of which are due to limitations of the conventional design and manufacturing processes.

A first problem is that the adhesive material used to connect the substrate layers in the multilayer stack causes leakage losses. As the number of layers increases, so does the total thickness of the adhesive layers, resulting in leakage losses that are not acceptable.

Another problem is that PCB manufacturing processes based on selective masking and etching requires blind metal vias and/or buried metal vias to be drilled through some of the substrates. Such vias are very difficult and expensive to build in PCB technology, and doing so can lead to a mechanical failure of the multilayer structure. Moreover, these vias impose strict design rules that might not be compatible with the layout of the radiating element of the antenna array and/or with the layout of their beam forming network. Therefore, such blind and/or buried vias should be reduced in number or avoided.

Another problem is related to some applications requiring a corporate feed network for wide band operation. More specifically antennas using a corporate feed network (CFN) design require a complex stack-up to bring the input signal from the feeding waveguide toward the radiating surface by using coupling slots or apertures among the various layers. As the number of radiating elements (e.g. slots, patches, dipoles, etc.) on the top layer of the waveguide structure increases, the number of layers of the corporate feed networks increase to preserve wide bandwidth features. This results in a bulky antenna structure having excessive manufacturing costs and complex to manufacture.

SUMMARY OF THE INVENTION

The object of the present invention is therefore to provide improved parallel plate waveguide structures for radiofrequency antennas, and manufacturing methods thereof, capable of overcoming at least some of the shortcomings identified above.

To that end, the invention relates to a multilayer waveguide structure for a radiofrequency antenna, the waveguide structure comprising:

- a stack of substrates separated by each other by interface layers, the substrates having a permittivity larger or equal to 1, and
- metal vias or metal trenches formed in at least some of the substrates,
- wherein each interface layer comprises a first metal layer, a second metal layer, and an adhesive layer between the first metal layer and the second metal layer,
- wherein at least one interface layer comprises patterned structures,
- wherein for each patterned structure, the interface layer is locally patterned so that the adhesive layer is thinner while still preventing a direct electric contact between the first and second metal layers,
- and wherein each said patterned structure is located near or at the base or the top of a metal via or metal trench.

According to advantageous aspects, the invention comprises one or more of the following features, considered alone or according to all possible technical combinations:

At least one interface layer comprises electromagnetic coupling slots in which the interface layer is locally patterned so that the first and second metal layers are locally thinner and the adhesive layer has an increased thickness.

The additional metal thickness of the first and/or second metal layers in each patterned structure is obtained by adding an additional metal layer to the first or second metal layer, respectively.

The first metal layer and the second metal layer each comprises an additional metal thickness.

A radiating aperture is formed in the waveguide structure by associating a first substrate comprising a metal through via, with a second substrate adjacent to the first substrate, said second substrate being devoid of metal via in the vicinity of the metal through via.

At least one of the substrates comprises input coupling slots and output coupling slots formed on a same side of the substrate.

The thickness of each interface layer is lower than or equal to 200 μm.

The thickness of the waveguide structure is lower than or equal to 25 mm.

The waveguide structure comprises a bottom substrate located at a lower end of the stack and configured to be coupled to an electromagnetic signal source.

The waveguide structure comprises a plurality of stages each comprising a plurality of substrate layers, wherein the waveguide structure defines one or more paths for the propagation of electromagnetic waves, wherein at least one stage is coupled to the second substrate layer of the next stage instead of being coupled with the first substrate layer of the next stage.

According to another aspect of the invention, a radiofrequency antenna comprises a waveguide structure as described above.

BRIEF DESCRIPTION OF THE DRAWINGS

The invention will be understood upon reading the following description, provided solely as an example, and made in reference to the appended drawings, in which.

DETAILED DESCRIPTION OF SOME EMBODIMENTS

Figure 1:
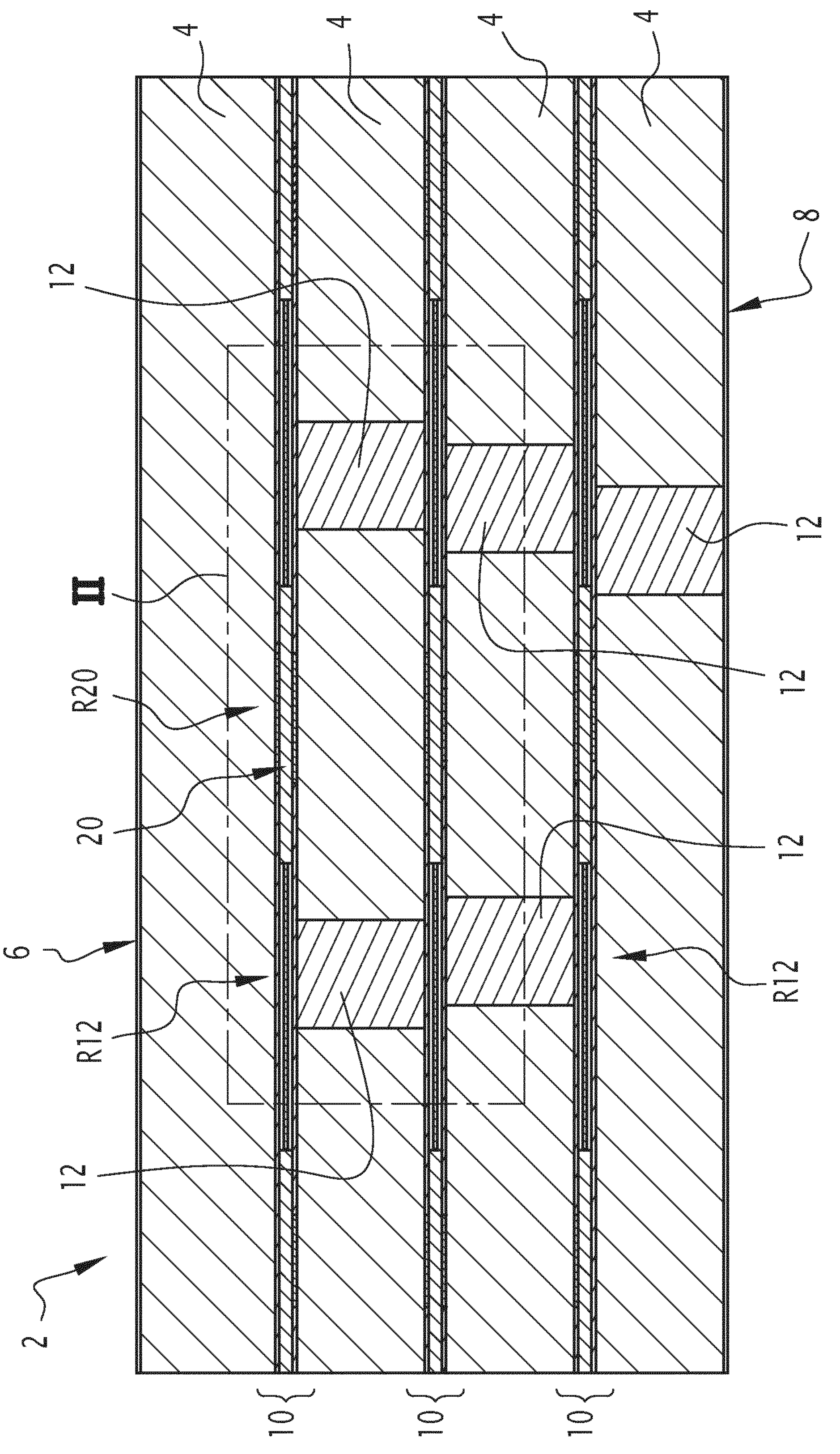
FIG. 1 illustrates a cross-section view of a waveguide structure for a radiofrequency antenna according to embodiments of the invention and highlighting an aspect of the invention.
Figure 2:
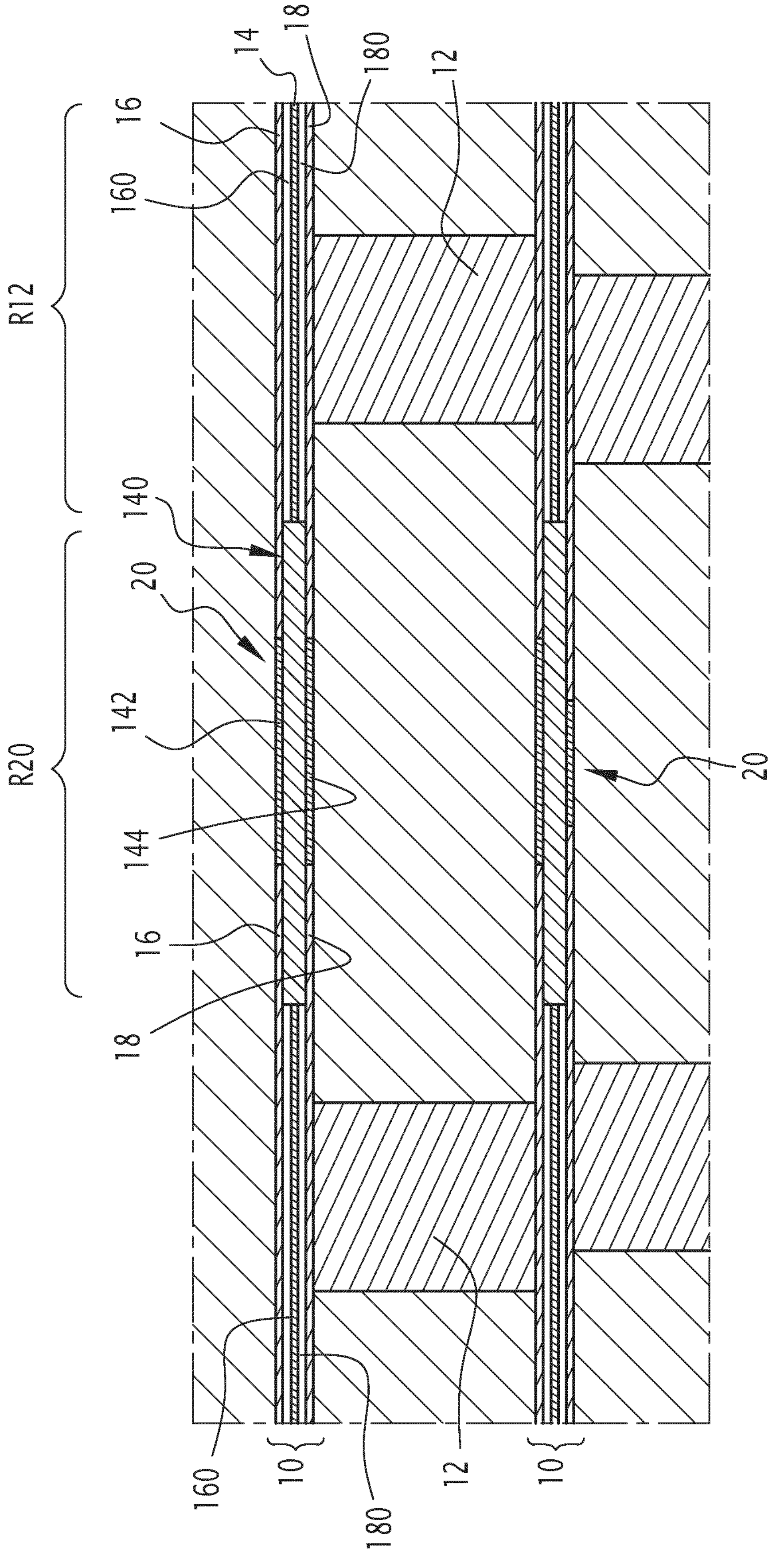
FIG. 2 is a close up view of the cross-section view of the waveguide structure of FIG. 1.

FIGS. 1 and 2 illustrate a multilayer waveguide structure 2 for a radiofrequency antenna. FIG. 2 is an enlarged view of a central region of FIG. 1 (identified by the reference sign II).

The waveguide structure 2 comprises a plurality of dielectric layers 4, or substrates 4, stacked together between a top metal layer 6 and a bottom metal layer 8.

In this description, unless specified otherwise, expressions such as "top", "bottom" and so on are given only for non-limiting illustrative purposes, as they may depend on the actual orientation of the waveguide structure 2.

The substrates 4 are separated from each other by interface layers 10.

In the illustrated example, four substrates 4 and three interface layers 10 are visible on the figure. However, in many embodiments, the waveguide structure 2 may comprise a different number of substrates 4 and/or a different number of interface layers 10.

The waveguide structure 2 is a planar waveguide structure.

Preferentially, the substrates 4 and the interface layers 10 have a planar shape and are preferentially arranged parallel to each other.

For example, the substrates 4 are printed circuit boards (PCB) substrates.

The waveguide structure 2 is configured to guide electromagnetic waves, for example between a first element (such as an antenna radiating element) connected to the topmost substrate 4 (e.g., adjacent to the top layer 6) and a second element (such as a radio transceiver) connected to the lowest substrate 4 (e.g., adjacent to the bottom layer 8).

The waveguide structure 2 is particularly suitable for planar antenna systems, such as patch antennas and more specifically patch antennas using a corporate feed network (CFN) design, or a continuous transverse stub (CTS), or long slot arrays.

The waveguide structure 2 comprises metal vias 12 or metal trenches formed in at least some of the substrates 4, and possibly in all substrates 4.

The vias 12 may be through vias and/or blind vias. The metal vias 12 can be replaced by metal trenches in many embodiments.

The vias 12 are arranged to form guiding channels capable of guiding electromagnetic waves through the multilayer stack of the waveguide structure 2. The guiding channels formed on a side of a substrate 4 are configured to be electromagnetically coupled with guiding channels formed on another substrate.

Thus, the location of the vias 12 in each substrate 4 and their position relative to the other vias 12 can be chosen during a design phase depending on the desired application or properties of the waveguide structure 2.

Similar considerations apply when metal vias 12 are replaced by metal trenches.

The waveguide structure 2 comprises electromagnetic coupling slots 20 configured to electromagnetically couple the guiding channels of two substrates separated by an interface layer 10.

The reference sign R12 points to first regions associated to the interface layer 10 and located near or at the base or the top of a metal via 12. For example, a first region R12 can be aligned with the base of a metal via 12 or with the top of a metal via 12. A first region R12 can be laterally displaced relative to the base of a metal via 12 or relative to the top of a metal via 12. Preferably, the same applies when a metal trench is used in place of a metal via 12.

The reference sign R20 points to second regions associated to the interface layer 10 and located between metal vias 12. For example, there is no metal via 12 vertically aligned to the second region R20 in the adjacent substrates 4.

As shown in detail on the enlarged view of FIG. 2, each interface layer 10 comprises an adhesive layer 14, a first metal layer 16 and a second metal layer 18. The adhesive layer 14 is sandwiched between the first metal layer 16 and the second metal layer 18.

For example, the first metal layer 16 is in contact with a first substrate 4 of the waveguide structure 2 located on one side of the interface layer 10 and the second metal layer 18 is in contact with a second substrate 4 of the waveguide structure 2 located on the opposite side of the interface layer 10.

Each of the adhesive layers 14 is configured to attach two adjacent substrates 4 to each other. For example, the adhesive layers 14 are made of a dielectric material.

The first metal layer 16 and the second metal layer 18 may be made of copper, or any suitable electrically conductive metallic material.

In practice, the first metal layer 16 and the second metal layer 18 may be deposited onto the corresponding substrates 4. For example, the first metal layer 16 is deposited on a first face of a first substrate 4, and the second metal layer 18 is deposited on a corresponding face of a second substrate turned towards the first metal layer 16.

According to an aspect of the invention, at least one interface layer 10, and preferably several interface layers 10, or every interface layer 10, comprises patterned structures to improve the electrical contact among layers.

The patterned structures, which may be referred to as "first patterned structures" in what follows, are configured to limit the propagation of electromagnetic waves through the adhesive layers 14.

In preferred embodiments, the first patterned structures R12 are periodic structures, i.e. patterned structures repeated periodically over the interface layers 10.

However, in some embodiments, the first patterned structures R12 could be repeated with an irregular pattern, e.g. non-periodically.

Preferably, for each patterned structure R12, the interface layer 10 is locally patterned or structured so that the adhesive layer 14 is thinner, while preventing a direct electric contact between the first and second metal layers 14, 16. Preferably, in each patterned structure R12, at least one of the metal layers is thicker.

In other words, desired electromagnetic properties are obtained through the repetition of the individual patterns R12 across the layer.

In some embodiments, the shape and dimensions of the repeated pattern may not be identical and may be different between different interface layers 10 and/or in a same interface layer 10.

In many embodiments, for example, the shape of the electromagnetic coupling slots is not necessarily symmetrical (e.g., the increased thickness or the thinning of material is not necessarily symmetrical relative to the geometrical plane of the layer). Only one of the metals layers 14 or 16 can have an increased thickness.

Each periodic structure is located at the base or at the top of a metal via 12, in a first region R12. In what follows, the reference R12 refers to the first patterned structures.

In addition, the first metal layer 16 and/or the second metal layer 18 each comprise an additional metal thickness 160, 180, respectively. In other words, in some embodiments, only one of the first metal layer 16 or the second metal layer 18 may comprise an additional metal thickness 160 or 180.

In other words, inside each patterned structure R12, due to the additional metal thickness 160 and 180, the total thickness of the metal layers is larger than the thickness of the metal layers 16, 18 outside of the patterned structures R12.

In some embodiments, the additional metal thickness 160, 180 of the first and second metal layers 16, 18 in each patterned structure R12 is obtained by adding an additional metal layer 160, 180 to the first or second metal layer, respectively.

In other embodiments, the additional thickness may be obtained by thinning material (e.g. by polishing or etching) the first and second metal layers 16, 18 outside of the patterned structures R12. In these locations, the adhesive layer 140 has an increased thickness.

For example, in the patterned structure R12 region, the thickness of each metal layer 16 or 18 equal to 25 μm, down from 55 μm for the nominal metal thickness (outside the regions R12). The thickness of the adhesive layers is increased to 80 μm, from a nominal thickness of 20 μm outside the regions R12. This example is not limiting and different values can be chosen in alternative embodiments.

In each patterned structure R12, the adhesive layer 14, despite being thinner, is nonetheless configured to prevent a direct electric contact between the first and second metal layers 16, 18. In other words, there is no direct metallic connection between any of the substrates 4.

For example, the thickness of the adhesive layer 14 in the narrow region of the periodic structure R12 is higher than or equal to 10 μm.

In addition, in the electromagnetic coupling slots 20, the interface layer 10 is locally patterned or structured so that the first and second metal layers 16, 18 are locally removed.

The resulting patterns may be referred to as "second patterned structures" as these patterned structures are different from the first patterned structures R12.

In many embodiments, for example, the electromagnetic coupling slots 20 can be square shaped, or cylinder shaped, or have any suitable shape as long as they allow for a suitable electromagnetic coupling between the two adjacent substrate layers 4 separated by the interface layer 10.

In many embodiments, for example, the shape of the electromagnetic coupling slots is not necessarily symmetrical (e.g., the increased thickness or the thinning of material is not necessarily symmetrical relative to the geometrical plane of the layer).

In some embodiments, the shape and dimensions of the coupling slots 20 may not be identical and may be different between different interface layers 10 and/or in a same interface layer 10.

Preferably, the patterning is arranged as laterally close as possible to the coupling slot 20, for example at a lateral distance of less than 1 mm from the coupling slot 20.

For example, the metal layers 16, 18 can be locally thinned inside the regions R20, by methods such as etching or polishing.

In addition, in the region R20, the adhesive layer 14 has an increased thickness 140.

In other words, inside each coupling slot region R20, due to the additional adhesive material, the total thickness of the adhesive layer is increased outside of the region R20.

For example, in the electromagnetic coupling slot 20, the thickness of the slot is equal to 20 μm, the nominal thickness of the adhesive layers is equal to 80 μm An advantage of this configuration is that it causes wide band transitions between layers and thus prevents the propagation of electromagnetic waves within the adhesive layers 14, thus reducing the leakage losses.

This pattern can be easily manufactured with normal etching processes using conventional printed circuit board technology. The waveguide structure 2 can thus be manufactured at large scales at a very low cost.

For example, the thickness of each interface layer is lower than or equal to 200 μm.

In many embodiments, the thickness of the waveguide structure is lower than or equal to 25 mm.

Figure 3:
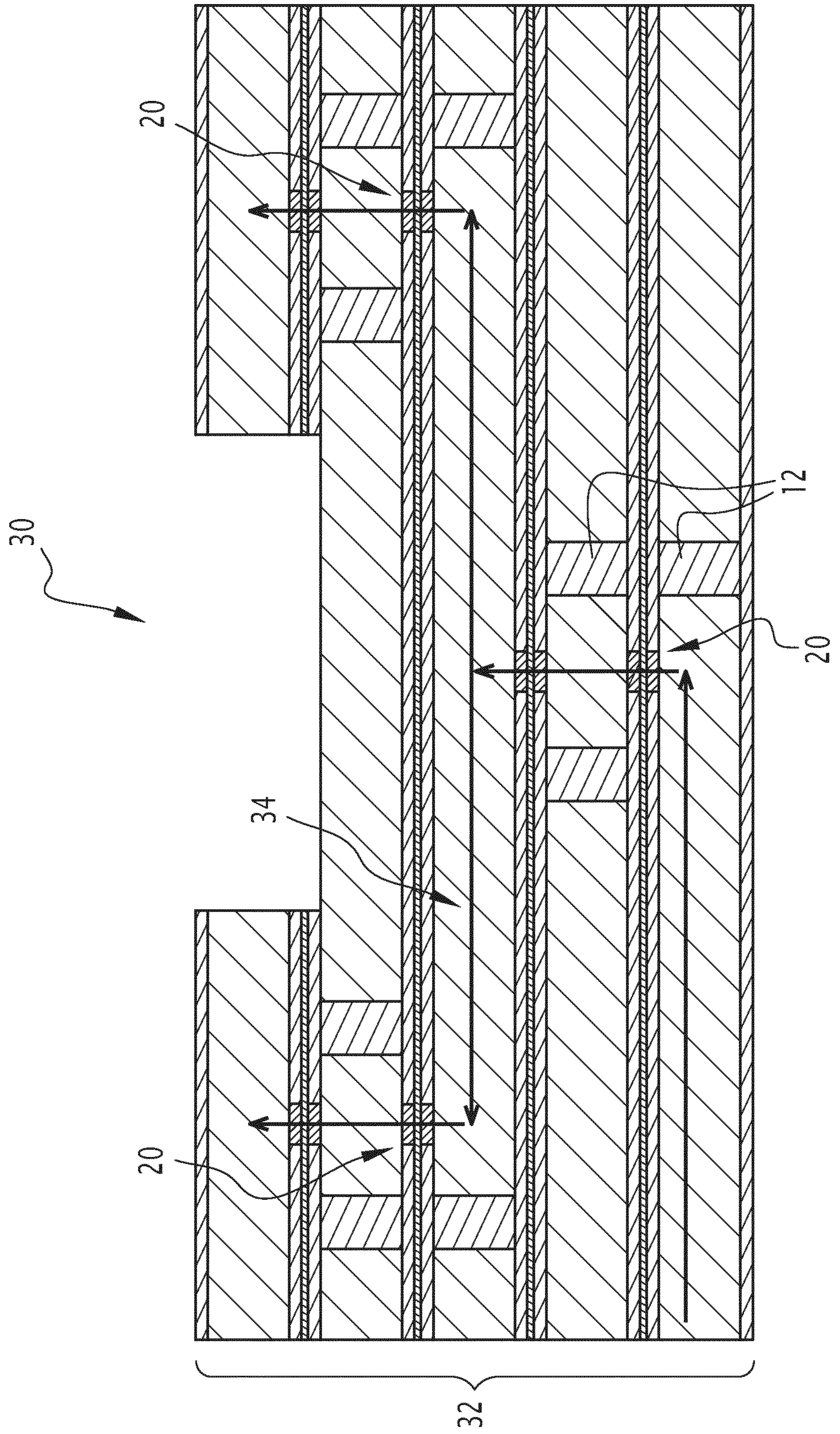
FIG. 3 illustrates a cross-section view of a prior art waveguide structure for a radiofrequency antenna.
Figure 4:
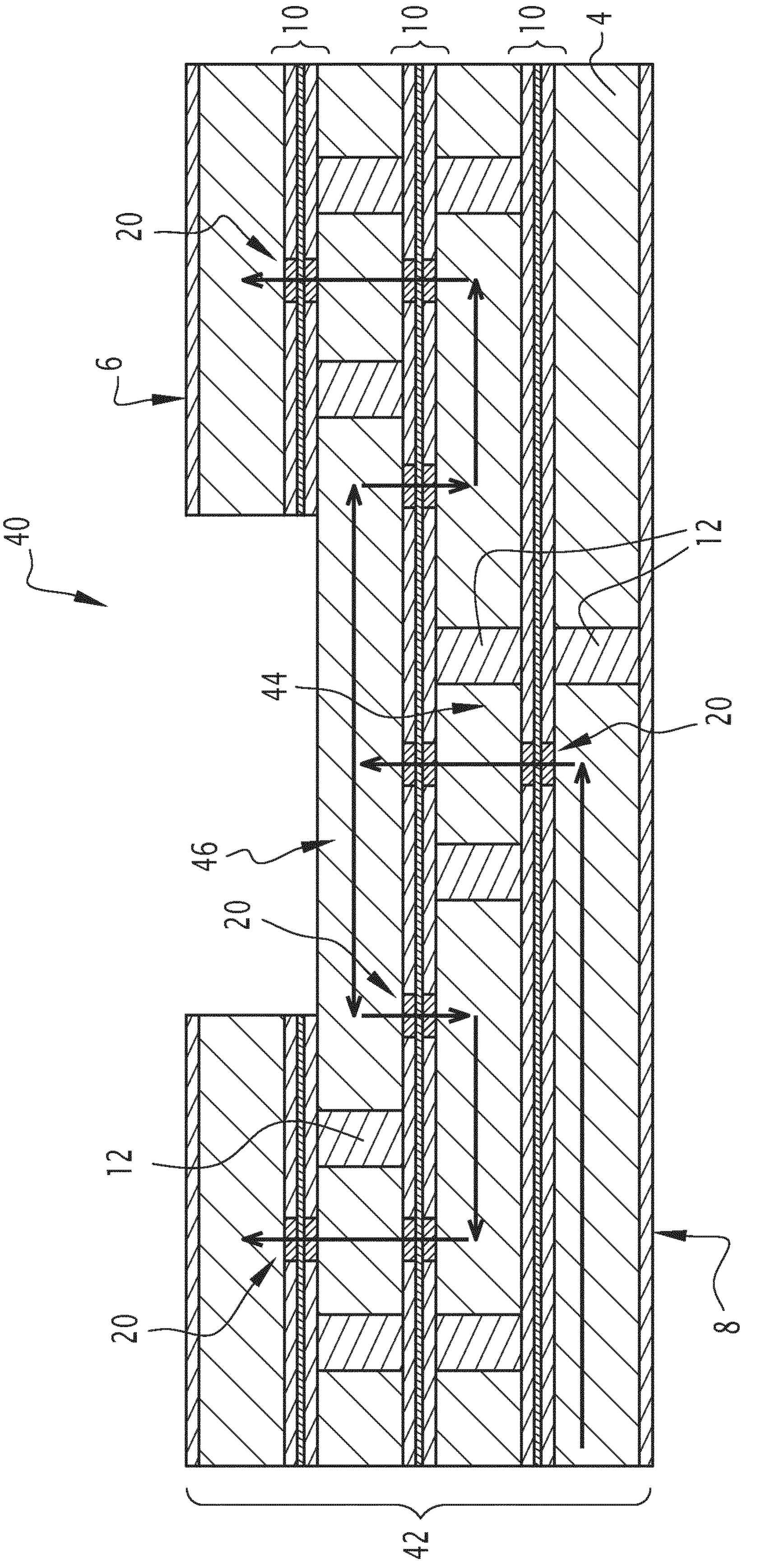
FIG. 4 illustrates a cross-section view of a waveguide structure for a radiofrequency antenna according to embodiments of the invention and highlighting another aspect of the invention.

FIGS. 3 and 4 illustrate an optional aspect of the invention.

FIG. 3 illustrates a power divider design found in conventional waveguide structures such as corporate feeding networks with a 1-to-2 power division architecture.

A plurality of radiating elements such slots, patches, dipoles are formed on the topmost substrate 4. The waveguide structure 30 is configured to be connected to a wave emitting source through the lowest substrate 4 of the stack. The solid arrows illustrate the propagation of electromagnetic waves through the waveguide structure from the source towards the radiating slots.

The allowed propagation paths are defined by the guiding channels 34, said guiding channels 34 being delimited by the metal vias 12.

The waves travel in succession through several stages 32, each stage 32 comprising one or more substrate layers 4.

In the illustrated example, a single stage 32 is illustrated, comprising five layers. The electromagnetic waves propagate upwards from one layer 4 to the next layer 4 through coupling slots 20.

A common issue with such designs is that, as the number of radiating elements on the top layer of the waveguide structure increases, the number of stages required in the waveguide structure will also increase, resulting in a bulky and oversized waveguide structure.

For example, assuming that all stages have equal number of layers, the final number of layers required is equal to the number $((L-1)\times S+1)$, where L is the number of layers per stage and S is the number of stages.

In the illustrated example, one of the layers 4 comprises one input coupling slot 20 and two output coupling slots 20 and the vias 12 are arranged laterally so as to allow the division of the wave into two waves. The output layer of each stage is coupled with the input layer of the next stage.

In advantageous embodiments, as illustrated in FIG. 4, to overcome this drawback each stage can be coupled to the second layer of the next stage, instead of being coupled with the first layer of the next stage.

For example, the waveguide structure 40 comprises a plurality of stages 42 each comprising a plurality of substrate layers 4 (separated by interface layers 10, as previously described). The waveguide structure defines one or more paths 44 for the propagation of electromagnetic waves. At least one stage 46 is coupled to the second substrate layer of the next stage instead of being coupled with the first substrate layer of the next stage.

For example, as illustrated on FIG. 4, at least one of the substrates 4 comprises input coupling slots and output coupling slots formed on a same side of the substrate 4.

In other words, the guiding channels and the coupling slots are arranged so that the waves are not forced to travel only upwards. Instead, as illustrated by the solid lines 44 which represent the path of the propagating electromagnetic waves, power can also flow downwards from one layer to another.

Some advantages of these embodiments include providing reduced radiation losses by avoiding the linear increase in the number of substrate layers found in prior art designs (as in the example of FIG. 3). Instead, the number of substrate layers will increase unitarily, saving costs, and reducing the manufacturing complexity and the volume of the system.

For example, assuming that all stages have equal number of layers, the final number of layers required is equal to the number $(L+S-1)$, where L is the number of layers per stage and S is the number of stages. In other words, each new stage only adds one layer to the system.

For example, in a waveguide structure having 128 radiating elements such as slots, with the known stacking design of FIG. 3, stacking layers for each stage may require up to 22 layers for a 7-stage system, each stage having 4 layers. With the improved design as illustrated in FIG. 4, the number of layers is reduced to only 10 layers (only some of these ten layers are visible in the illustrated example). This reduces the fabrication costs of the waveguide structure by more than 50%. In addition, manufacturing tolerances only affect the required 10 layers instead of 22 layers, leading to a more robust system. The volume of the system is also reduced by the same factor.

Preferably, coupling slots 20 are arranged on opposite sides of at least one metal vias 12 or metal trenches. With this pattern, the coupling slots 20 work as an open circuit so any power directed towards them is reflected back. Tests and simulations have shown that this configuration allows, for a system of five layers, a reduction of losses from 1 dB per layer to less than 0.1 dB per layer. This corresponds to an improvement by a factor of ten.

In many embodiments, the coupling slots 20 may comprise an enlarged adhesive layer R20 as described previously.

Similarly, in many advantageous embodiments, the interface layers 10 may comprise periodic structures R12 as previously described.

An exemplary application of the invention is now described for illustrative purposes.

A radiofrequency antenna system comprises a waveguide structure 2 as previously described. In this example, the antenna system is a wide band low-profile corporate feeding network connected to a radiating panel of continuous transverse stubs (CTS) antenna array. In other embodiments, the CFN can be connected to long slot arrays.

The antenna system is capable of operating in a range of frequencies from 17 GHz to 31 GHZ, covering both the uplink and downlink channels of the K/Ka-bands for satellite communications applications. The radiating aperture of the antenna array is tapered through the waveguide structure 2 to reduce the side lobe levels (SLL) below a given value (e.g., −18 dB) over the entire frequency band.

The total number of substrate layers used in this example is 15 layers, for a Rogers type substrate with 128 slots, including a matching slab on top of the CTS antenna array. The interface layers 10 between each two consecutive substrates have a thickness equal to 80 μm. The full thickness of the stack is equal to 13.6 mm. Thus, the waveguide structure 2 has a small size.

The waveguide structure can be easily manufactured with simple PCB manufacturing technologies (such as metallization, selective masking and etching, polishing, etc.) at a low cost. Other manufacturing technologies are nonetheless possible.

In other embodiments, the invention can be applied to any multilayer system, such as electronic circuits.

Other embodiments are possible. The embodiments and alternatives described above may be combined with each other in order to generate new embodiments of the invention.

The invention claimed is:

1. A multilayer waveguide structure for a radiofrequency antenna, the waveguide structure comprising:

a stack of substrates separated by each other by interface layers, the substrates having a permittivity larger or equal to 1, and metal vias or metal trenches formed in at least some of the substrates, the waveguide structure being configured to guide electromagnetic waves between a first element connected to the topmost substrate and a second element connected to the lowest substrate, wherein each interface layer comprises a first metal layer, a second metal layer, and an adhesive layer between the first metal layer and the second metal layer, wherein at least one of said interface layer comprises patterned structures, wherein for each patterned structure, an additional metal thickness of the first metal layer is obtained by adding an additional metal layer to the first metal layer and/or an additional metal thickness of the second metal layer is obtained by adding an additional metal layer to the second metal layer and the interface layer is locally patterned so that the adhesive layer is thinner while still preventing a direct electric contact between the first and second metal layers, wherein the patterned structures are configured to limit the propagation of the electromagnetic waves through the adhesive layer, wherein each said patterned structure is located near or at the base or the top of a metal via or metal trench, and wherein the metal vias or trenches are configured to delimit guiding channels for the electromagnetic waves.

2. The waveguide structure of claim 1, wherein at least one interface layer comprises electromagnetic coupling slots in which the interface layer is locally patterned so that the first and second metal layers are locally thinner and the adhesive layer has an increased thickness.

3. The waveguide structure according to claim 1, wherein the first metal layer and the second metal layer each comprise an additional metal thickness.

4. The waveguide structure according to claim 1, wherein a radiating aperture is formed in the waveguide structure by associating a first substrate comprising a metal through via, with a second substrate adjacent to the first substrate, said second substrate being devoid of metal via in the vicinity of the metal through via.

5. The waveguide structure according to claim 1, wherein at least one of the substrates comprises input coupling slots and output coupling slots formed on a same side of the substrate.

6. The waveguide structure according to claim 1, wherein the thickness of each interface layer is lower than or equal to 200 μm.

7. The waveguide structure according to claim 1, wherein the thickness of the waveguide structure is lower than or equal to 25 mm.

8. The waveguide structure according to claim 1, wherein the waveguide structure comprises a bottom substrate located at a lower end of the stack and configured to be coupled to an electromagnetic signal source.

9. The waveguide structure according to claim 1, wherein the waveguide structure comprises a plurality of stages each comprising a plurality of substrate layers, wherein the waveguide structure defines one or more paths for the propagation of electromagnetic waves, wherein at least one stage is coupled to the second substrate layer of the next stage instead of being coupled with the first substrate layer of the next stage.

10. A radiofrequency antenna comprising a waveguide structure according to claim 1.

* * * * *